US012140989B2

(12) United States Patent
Dhand et al.

(10) Patent No.: US 12,140,989 B2
(45) Date of Patent: Nov. 12, 2024

(54) APPARATUS AND METHODS FOR IMPLEMENTING ARBITRARY UNITARY TRANSFORMATIONS ON OPTICAL MODES VIA A RECTANGULAR ARCHITECTURE

(71) Applicant: Xanadu Quantum Technologies Inc., Toronto (CA)

(72) Inventors: Ish Dhand, Toronto (CA); Shreya Prasanna Kumar, Toronto (CA); Daiqin Su, Wuhan (CN); Kamil Bradler, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 1001 days.

(21) Appl. No.: 17/037,234

(22) Filed: Sep. 29, 2020

(65) Prior Publication Data

US 2021/0096443 A1 Apr. 1, 2021

Related U.S. Application Data

(60) Provisional application No. 62/908,714, filed on Oct. 1, 2019.

(51) Int. Cl.
*G06E 3/00* (2006.01)
*G02F 1/313* (2006.01)
*G06E 1/04* (2006.01)

(52) U.S. Cl.
CPC ........... *G06E 3/008* (2013.01); *G02F 1/3136* (2013.01); *G06E 1/045* (2013.01)

(58) Field of Classification Search
CPC ............................... G06E 1/045; G06E 3/008
See application file for complete search history.

(56) References Cited

U.S. PATENT DOCUMENTS

| 10,641,954 B2 | 5/2020 | Clements et al. |
| 10,763,974 B2 | 9/2020 | Bunandar et al. |
| 11,454,862 B2 | 9/2022 | Bradler et al. |

(Continued)

OTHER PUBLICATIONS

D. Su et al. Hybrid spatiotemporal architectures for universal linear optics. Physical Review A 99, 062301, Jun. 2019. (https://doi.org/10.1103/PhysRevA.99.062301) (Year: 2019).*

(Continued)

*Primary Examiner* — Michael Stahl
(74) *Attorney, Agent, or Firm* — Cooley LLP

(57) ABSTRACT

An apparatus includes a first optical circuit and a second optical circuit. The first optical circuit has a network of interconnected interferometers to perform an M-mode universal transformation on N input optical modes that are divided into (M−1) groups of pulses. The first optical circuit also includes M input ports. Each input port of a first (M−1) input ports is configured to receive a corresponding group of pulses in the (M−1) groups of pulses. The first optical circuit also includes M output ports and a first delay line to couple an Mth output port with an Mth input port. The second optical circuit includes a network of beamsplitters and swap gates to perform a (2M−3)-mode residual transformation. The first optical circuit and the second optical circuit are configured to perform an arbitrary N-mode unitary transformation to the N input optical modes via a rectangular architecture.

18 Claims, 11 Drawing Sheets

(56) References Cited

U.S. PATENT DOCUMENTS

| | | |
|---|---|---|
| 2014/0299743 A1* | 10/2014 | Miller .................. G02F 1/0136 |
| | | 359/629 |
| 2017/0351293 A1 | 12/2017 | Carolan et al. |
| 2019/0086610 A1 | 3/2019 | Clements et al. |
| 2021/0097421 A1 | 4/2021 | Dhand et al. |
| 2021/0133547 A1* | 5/2021 | Lin ....................... G06N 3/067 |
| 2021/0191232 A1 | 6/2021 | Bradler et al. |

OTHER PUBLICATIONS

W.R. Clements et al. Optimal design for universal multiport interferometers. Optica 3:12, 1460-1465, Dec. 2016. (https://doi.org/10.1364/OPTICA.3.001460) (Year: 2016).*

Su et al., Hybrid spatiotemporal architectures for universal linear optics, Phys. Rev. A., vol. 99, 062301, Jun. 3, 2019, pp. 1-8.

* cited by examiner

FIG. 4

APPARATUS AND METHODS FOR IMPLEMENTING ARBITRARY UNITARY TRANSFORMATIONS ON OPTICAL MODES VIA A RECTANGULAR ARCHITECTURE

CROSS-REFERENCE TO RELATED APPLICATIONS

This application claims the benefit of U.S. Provisional Patent Application No. 62/908,714, filed Oct. 1, 2019 and titled "Apparatus and Methods for Implementing Arbitrary Unitary Transformations on Optical Modes via a Rectangular Architecture," the entire content of which is incorporated by reference herein in its entirety for all purposes.

FIELD

One or more embodiments relate to implementing arbitrary unitary transformations on optical modes via a rectangular architecture.

BACKGROUND

Linear optics is a promising route to attaining quantum computational advantage via, e.g., boson sampling, Gaussian boson sampling, and quantum simulations of vibronic spectra. Obtaining a quantum advantage in linear optics usually involves a large number of optical modes. For example, boson sampling, which has been recently shown to outperform classical algorithms, uses about 30 to 50 indistinguishable photons in thousands of modes. Some known approaches for implementing linear optics (e.g., performing linear transformations of optical modes) use integrated photonic chips, which allow for fast, low-loss, and stable actions on the spatial modes of light. These approaches, however, are difficult to scale up for a large number N of optical modes because the total number of optical elements in such a single photonic chip is proportional to $N^2$. In addition, these optical elements usually also have corresponding elements for classical control and processing, thereby further increasing the footprint and complexity of the resulting device.

SUMMARY

Some embodiments described herein relate generally to implementing arbitrary unitary transformations via a rectangular architecture, and, in particular, to implementing large N-mode unitary transformations via a combination of smaller M-mode optical circuits. In some embodiments, an apparatus includes a first optical circuit having a network of interconnected interferometers and configured to perform an M-mode universal transformation on N input optical modes that are divided into (M−1) groups of optical pulses. The first optical circuit includes M input ports and each input port of a first (M−1) input ports from the M input ports is configured to receive a corresponding group of pulses in the (M−1) groups of pulses. The first optical circuit also includes M output ports and a first delay line configured to couple an Mth output port in the M output ports with an Mth input port in the M input ports. The apparatus also includes a second optical circuit in optical communication with the first optical circuit and configured to perform an (2M−3)-mode residual transformation on the N input optical modes. The second optical circuit includes a network of beamsplitters and swap gates. The first optical circuit and the second optical circuit are configured to perform an arbitrary N-mode unitary transformation to the N input optical modes via a rectangular architecture.

In some embodiments, an apparatus includes a first optical circuit having a network of interconnected interferometers. The first optical circuit is configured to perform an M-mode universal transformation on N input optical modes that are divided into M groups of pulses. Each group of pulses in the M groups of pulses includes l pulses and adjacent pulses are separated by a delay τ, where N, M, l are positive integers, N is greater than M, and l=N/M. The apparatus also includes a second optical circuit in optical communication with the first optical circuit and configured to perform an (2M)-mode cosine-sine transformation on the N input optical modes. The second optical circuit includes a first plurality of the M input ports in optical communication with the M output ports of the first optical circuit and a second plurality of the M input ports in optical communication with the M output ports of the first optical circuit via M delay lines. Each delay line from the M delay lines is configured to couple an output port in the M output ports of the first optical circuit with a corresponding input port in the second plurality of M input ports. The second optical circuit also includes M beamsplitters, each of which is in optical communication with one input port in the first plurality of the M input ports and one input port in the second plurality of the M input ports.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

FIG. 4 is a diagram illustrating cosine-sine (CS) decomposition of a 12-mode unitary matrix $U_{12}$, according to an embodiment.

DETAILED DESCRIPTION

Figure 1:
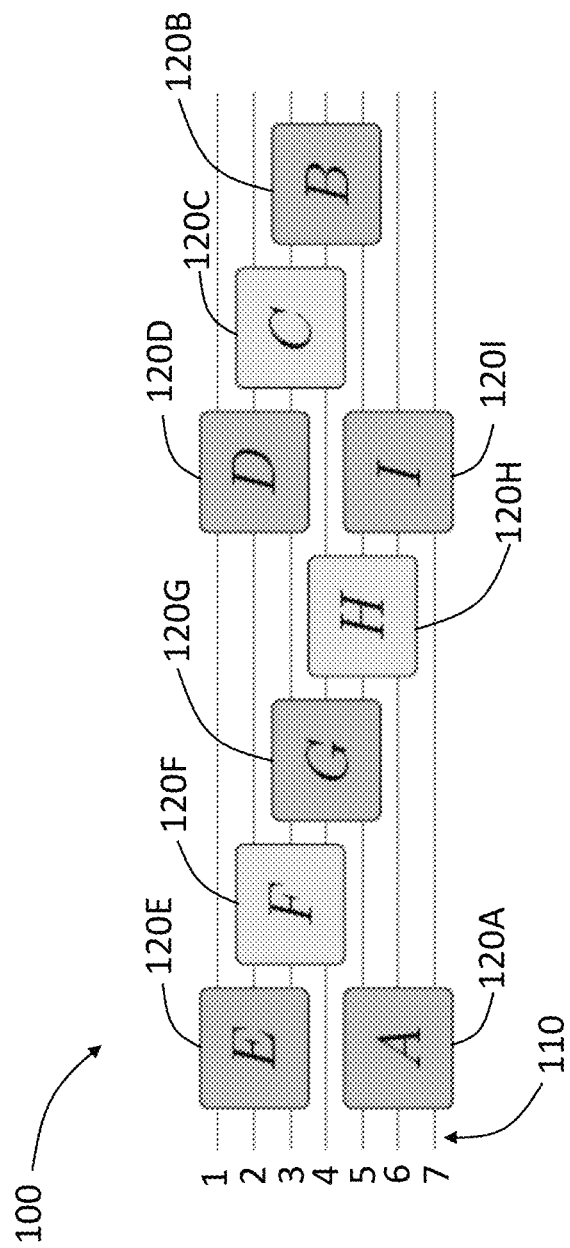
FIG. 1 is a diagram illustrating elimination-based decomposition of an arbitrary unitary matrix U(7), according to an embodiment.

To address the challenges in implementing arbitrary unitary transformations, apparatus and methods described herein employ a modular approach, in which smaller M-mode linear optical interferometers are systematically combined to implement a larger N-mode transformation. This approach allows the implementation of large linear optical transformations using smaller modules that act on the spatial and/or the internal degrees of freedom of optical modes, such as polarization, time, or orbital angular momentum. This approach also leads to a rectangular gate structure, which generally has fewer optical elements and smaller circuit depth compared to known approaches, such as the triangular gate structure. In addition, optical modes that undergo a unitary transformation in a rectangular structure propagate through roughly the same number of optical elements, thereby incurring balanced losses among these optical modes. Accordingly, the rectangular structure can substantially enhance process fidelities (e.g., in quantum information processing) as compared to known schemes. These advantages can be used to attain quantum computational advantage via boson sampling, Gaussian boson sampling, and quantum simulations of vibronic spectra, as well as to achieve universal quantum computation.

The modular approach can be illustrated in two steps: decomposition and implementation. In decomposition (also referred to as factorization), a given unitary matrix U(N) that characterizes a unitary transformation is expressed as a product of several smaller unitary matrices U(M), where N and M are the number of optical modes for unitary transformations, and M is less than N. The implementation step is to realize the decomposition using optical components. For example, U(2) (i.e., M=2) transformations can be achieved by beamsplitters that act on different spatial modes of light or different temporal modes connected via optical delay lines. For M>2, the obtained U(M) transformations can be used to implement transformations on the combined spatial and internal degrees of freedom of light, such as polarization and orbital angular momentum, or on the combined temporal and spatial modes of light. More details to implement a U(M) transformation are described below with reference to, for example, FIG. 3B.

Without loss of generality, a given unitary matrix U describes a linear optical transformation that maps the bosonic annihilation and creation operators $[\alpha_i, \alpha_i^\dagger]$ (and similarly for the Hermitian conjugates) according to:

$$a_i \to a_i' = \sum_{j=1}^{N} U_{ij} a_j \quad (1)$$

The decomposition procedure results in a sequence of smaller unitary transformations, each of which can be realized using optical elements (e.g., one or more beamsplitters).

In some instances, decompositions rely on nulling the entries of the matrix U by multiplying it with simpler matrices. The nulling is typically performed using matrices in the form $T_{m,n}(\theta,\phi)$, which is a N×N matrix and differs from the N×N identity matrix $I_N$ only in the entries at the intersection of the m-th and n-th rows and columns. These elements are:

$$\begin{pmatrix} \cos\theta e^{i\phi} & -\sin\theta \\ \sin\theta e^{i\phi} & \cos\theta \end{pmatrix} \quad (2)$$

More specifically, the $T_{mn}(\theta,\phi)$ matrix (assuming m<n) can be written as:

$$T_{mn}(\theta, \phi) \stackrel{def}{=} \begin{pmatrix} 1 & & & & & \\ & \ddots & & & & \\ & & e^{i\phi}\cos\theta & & -\sin\theta & \\ & & & \ddots & & \\ & & e^{i\phi}\sin\theta & & \cos\theta & \\ & & & & & \ddots \\ & & & & & & 1 \end{pmatrix} \quad (3)$$

where the diagonal dots represent unity elements and the elements that are not shown are zero. The locations of the elements $e^{i\phi}\cos\theta$, $-\sin\theta$, $e^{i\phi}\sin\theta$, and $\cos\theta$ are (m, m), (m, n), (n, m), and (n, n), respectively.

The inverse of the $T_{mn}$ matrices can be written as:

$$T_{mn}^{-1}(\theta, \phi) = \begin{pmatrix} 1 & & & & & \\ & \ddots & & & & \\ & & e^{-i\phi}\cos\theta & & e^{-i\phi}\sin\theta & \\ & & & \ddots & & \\ & & -\sin\theta & & \cos\theta & \\ & & & & & \ddots \\ & & & & & & 1 \end{pmatrix} \quad (4)$$

Henceforth, the arguments $\theta$ and $\phi$ are dropped to simplify the notation.

Given input matrices can be multiplied by the $T_{mn}$ and $T_{mn}^{-1}$ matrices to null their elements. For example, multiplying a given matrix with $T_{mn}^{-1}$ from the right leads to a new matrix that is identical to the old one except in columns m and n, which are now mixed together with weights given by the elements of $T_{mn}^{-1}$. Parameters $\theta$ and $\phi$ can be chosen such that the mixing results in one element out of these two columns being nulled, i.e., becoming zero after multiplication. Therefore, a sequence of $T_{mn}$ and $T_{mn}^{-1}$ matrices can be applied to a given matrix to null each non-diagonal element in the given matrix.

Based on the above, at least two types of decompositions can be used in the modular approach described herein. The first type of decomposition is referred to as the elimination-based decomposition and the second type of decomposition is referred to as the cosine-sine (CS) decomposition. Each type of decomposition and the corresponding implementation is described below.

The elimination-based decomposition groups elements from neighboring modes in N input modes together into M-mode universal transformations and specialized (2M−3)-mode residual transformations. As used herein, a universal transformation refers to a general M-mode transformation that can be implemented with a linear optical interferometer. M-mode universal transformations are parametrized by $M^2-1$ free, real-valued parameters. A residual transformation refers to a specialized M-mode transformation that is parametrized by fewer than $M^2-1$ free, real-valued parameters.

The elimination-based decomposition is achieved by systematically nulling the entries of a unitary matrix by multiplying the unitary matrix with $T_{mn}$ from the left and $T_{mn}^{-1}$ from the right. Such systematic nulling results in a rectangular structure (also referred to as a rectangular architecture) of the optical circuit that implements the decomposition. In a rectangular structure, input optical modes travel through roughly the same number of optical elements in the optical circuit, thereby leading to balanced optical losses among these input optical modes. In contrast, known methods of unitary matrix decomposition generally result in a triangular architecture, where different input optical modes travel through different numbers of optical components and therefore incur different losses (e.g., the difference can be tens of times). In addition, the maximum optical losses incurred by any mode in the rectangular architecture can be much less (e.g., about 50% less) than the maximum optical losses in the triangular architecture implementing the same transformation.

To illustrate the elimination-based decomposition, the following description uses, as an example, a general SU(7) matrix $U_7$ that is decomposed into U(3) matrices. The method described herein can be extended to other unitary matrices as well. Without loss of generality, the matrix $U_7$ can be written as:

$$\begin{pmatrix} * & E_{(1,2)}^{12,r} & E_{(2,3)}^{11,r} & D_{(1,2)}^{10,\ell} & D_{(1,2)}^{8,\ell} & A_{(5,6)}^{2,r} & A_{(6,7)}^{1,r} \\ & * & E_{(1,2)}^{13,r} & F_{(2,4)}^{14,r} & D_{(2,3)}^{9,\ell} & C_{(2,4)}^{7,\ell} & A_{(8,7)}^{3,r} \\ & & * & G_{(3,4)}^{16,r} & G_{(4,5)}^{15,r} & B_{(3,4)}^{5,\ell} & B_{(3,4)}^{4,\ell} \\ & & & * & G_{(4,5)}^{17,r} & H_{(4,6)}^{18,r} & B_{(4,5)}^{5,\ell} \\ & & & & * & I_{(5,6)}^{20,r} & I_{(6,7)}^{19,r} \\ & & & & & * & I_{(6,7)}^{21,r} \\ & & & & & & * \end{pmatrix} \quad (5)$$

In Equation (5), the bottom off-diagonal part is omitted for simplicity because $U^H=U^{-1}$. In general, the elements in $U_7$ are complex-valued and they are divided into nine groups labelled by capital letters E, D, A, F, C, G, B, H, and I. In addition, the subscript (m, n) for each element indicates the $T_{mn}$ matrix that is used to null this element. The superscript l or r indicates whether the element is nulled by multiplying the $U_7$ with a $T_{mn}$ matrix from the left (i.e., l) or a $T_{mn}^{-1}$ matrix from the right (i.e., r).

The elimination-based decomposition of $U_7$ begins by nulling the three elements in group A by multiplying $U_7$ from the right, i.e., $U_7 \rightarrow U_7(T_{67}T_{56}T_{67})^{-1}$. This nulling can be realized because the elements in group A are within a triangular block. Then the T matrices in the parenthesis can be grouped together into U(3) matrices (denoted as $A^{-1}_{5\ldots7}$) acting on three adjacent rows (i.e., rows 5 to 7) in $U_7$ and leaving the other rows unchanged, i.e., $U_7 \rightarrow U_7 A^{-1}_{5\ldots7}$.

The next step involves a multiplication from the left according to: $U_7 A^{-1}_{5\ldots7} \rightarrow (T_{34}T_{45}T_{34}) U_7 A^{-1}_{5\ldots7} = B^{-1}_{3\ldots5} U_7 A^{-1}_{5\ldots7}$, where $B^{-1}_{3\ldots5}$ is a U(3) matrix that acts on rows 3 to 5 in $U_7 A^{-1}_{5\ldots7}$ and leaves other rows unchanged. This alternation between nulling from the left and nulling from the right leads to the rectangular structure of the optical circuit that implements the decomposition (see, e.g., FIG. 1).

The above nulling process is then repeated for all groups and the matrix U7 can be decomposed into: $D^{-1}_{1\ldots3} C^{-1}_{2\ldots4} B^{-1}_{3\ldots5} U_7 A^{-1}_{5\ldots7} E^{-1}_{1\ldots3} F^{-1}_{2\ldots4} G^{-1}_{3\ldots5} H^{-1}_{4\ldots6} I^{-1}_{5\ldots7} = D'_7$, where $D'_7$ is a diagonal unitary matrix. The matrices A through I can be moved to the right-hand side by taking the inverse of each matrix and the matrix $U_7$ can now be written as: $U_7 = D_7 B_{3\ldots5} C_{2\ldots4} D_{1\ldots3} I_{5\ldots7} H_{4\ldots6} G_{3\ldots5} F_{2\ldots4} A_{5\ldots7}$. In other words, the matrix $U_7$ is decomposed into U(3) matrices B, C, D, I, H, G, F, E, and A. The diagonal phase matrix is absorbed into the other matrices. Out of the nine matrices in the decomposition, matrices A, B, D. E, G, and I are universal matrices representing universal transformations, and matrices C, F, and H are residual matrices representing residual transformations.

FIG. 1 is a diagram of an optical circuit 100 illustrating elimination-based decomposition of a unitary matrix U(7), according to an embodiment. The optical circuit 100 includes seven input ports 110 to receive seven input optical modes (labelled as 1 to 7) and is configured to perform an arbitrary unitary transformation on the seven input optical modes via nine interferometers 120A through 120I. Out of these nine interferometers, six interferometers are universal U(M) interferometers (i.e., 120E, 120A, 120G, 120D, 120I, and 120B) and three interferometers are residual U(2M−3) interferometers (i.e., 120F, 120H, and 120C).

As described above, the elimination-based decomposition of $U_7$ is written as $U_7 = D_7 B_{3\ldots5} C_{2\ldots4} D_{1\ldots3} I_{5\ldots7} H_{4\ldots6} G_{3\ldots5} F_{2\ldots4} E_{1\ldots3} A_{5\ldots7}$. The subscripts of each matrix in the decompositions also indicate the modes the matrix acts on. For example, $A_{5\ldots7}$ acts on input optical modes 5 to 7, and in the optical circuit 100, the interferometer 120A implementing the matrix $A_{5\ldots7}$ is coupled to the fifth to seventh input ports to perform a unitary transformation on input optical modes 5 to 7. In another example, the interferometer 120E is configured to implement matrix $E_{1\ldots3}$ and is coupled to the first to third input ports so as to perform a unitary transformation on input optical modes 1 to 3. Other interferometers in the optical circuit 100 are arranged in a similar way.

As can be seen in FIG. 1, the elimination-based decomposition combines multiple small M-mode optical interferometers (e.g., 120A to 120I) to realize a larger scale unitary transformation U(N) on N input optical modes. These M-mode optical interferometers can be realized in various ways. In some implementations, the M-mode optical interferometers include integrated photonic chips that implement unitary transformations on M spatial modes (see, e.g., FIGS. 3A-3C). In some embodiments, the M-mode optical interferometers include optical loops acting on M time bins. In some embodiments, the M-mode optical interferometers include waveplates acting on M polarization modes (typically M=2).

In addition, the optical circuit 100 includes fewer optical components compared to optical circuits in triangular architecture and therefore has a smaller circuit depth. Without being bound by any particular theory or mode of operation, the circuit depth refers to the maximal number of optical elements traveled through by an optical mode from input to output in the circuit. Using fewer optical elements can also lead to enhanced robustness against circuit imperfections because the probability of a circuit imperfection is generally proportionally to the number of optical elements in the circuit. Furthermore, in the optical circuit 100 that has a rectangular structure, input optical modes 1-7 traverse roughly the same number of optical elements and therefore incur similar optical losses at the output. The balanced loss can be beneficial in applications that involve post-selection of the measured light.

The elimination-based decomposition described above can be extended to decompose a general unitary matrix U(N) that implements a unitary transformation on N input optical modes. In some instances, N can be written as N=k×(M−1)+1, where k is a positive integer, and U(N) can be decomposed into k(k+1)/2 universal U(M) matrices and k(k−1)/2 residual matrices. In some instances, N may not be written as k×(M−1)+1. In these instances, the given unitary matrix can be modified by direct summing with suitable identity operations, i.e., by adding more rows and columns that are zero everywhere except when the row index is equal to the column index. For example, if $N_0$=20, M=5, one row and one column can be added to obtain a new $N_1$=21 and $N_1$=k×(M−1)+1, where k=5, M=5. The new $U(N_1)$ can then be decomposed using the methods described herein. But no light is sent into the additional mode(s) and no light is emitted from the additional mode(s), so the extra modes do not affect the original transformation $U(N_0)$.

Figure 2:
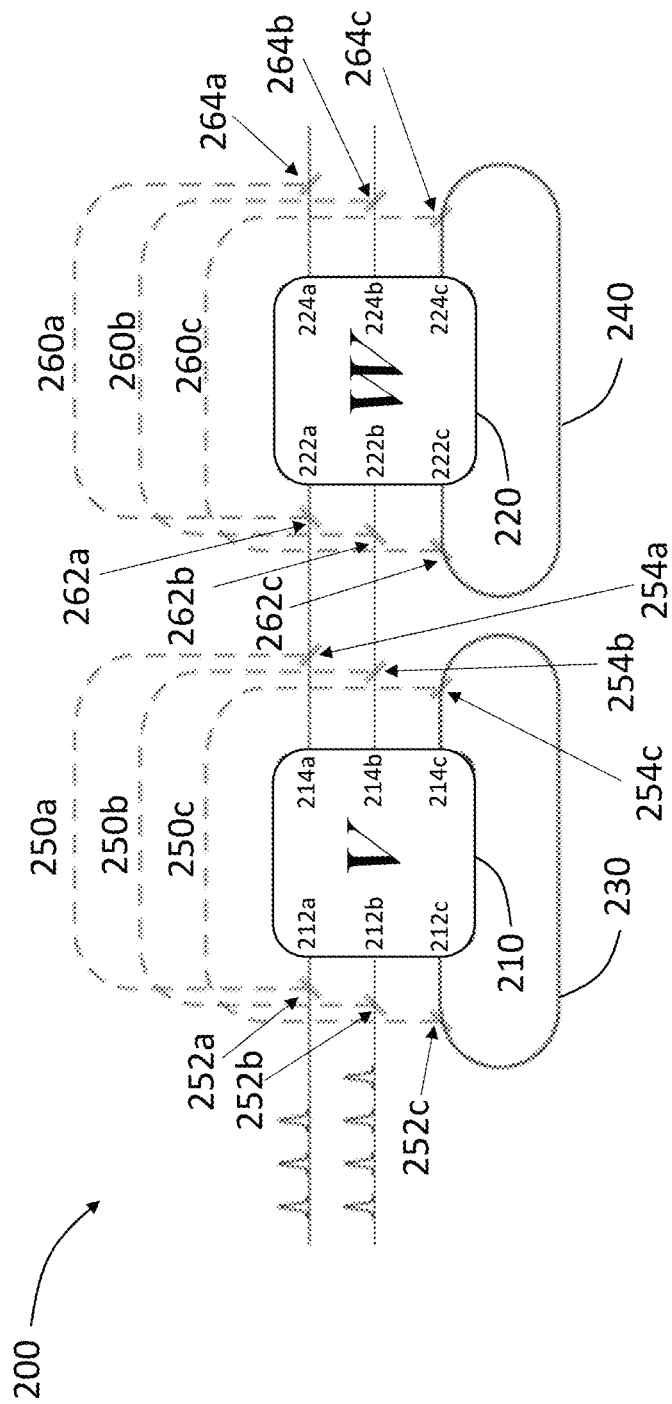
FIG. 2 is a schematic of an apparatus for implementing an arbitrary unitary transformation based on elimination-based decomposition, according to an embodiment.

FIG. 2 is a schematic of an apparatus 200 for implementing an arbitrary unitary transformation based on elimination-based decomposition, according to an embodiment. Compared to the optical circuit 100, the apparatus 200 has fewer optical elements and therefore is more compact and cost effective. The apparatus 200 includes a universal interferometer 210 and a residual interferometer 220. For illustrative purposes only, the universal interferometer 210 includes three input ports 212a, 212b, and 212c (collectively referred to as input ports 212) to implement a 3-mode unitary transformation (i.e., a U(3) interferometer). In some embodiments, the number of input ports M in the universal interferometer 210 can be about 3 to about 100 (e.g., about 3, about 5, about 10, about 20, about 30, about 50, or about 100, including any values and sub ranges in between).

The universal interferometer 210 also includes three output ports 214a, 214b, and 214c (collectively referred to as output ports 214). A first delay line 230, as illustrated in FIG. 2, is used in the apparatus 200 to optically couple the third output port 214c with the third input port 212c. In a linear interferometer, the numbering of input ports (or output ports) can usually be interchanged (or permuted) without affecting the substance of the transformation implemented by the linear interferometer. Therefore, the first delay line 230 can optically couple any one output port with any one input port.

The apparatus 200 also includes three input switches 252a, 252b, and 252c optically coupled to the three input ports 212a, 212b, and 212c, respectively. Three output switches 254a, 254b, and 254c are optically coupled to the three output ports 214a, 214b, and 214c, respectively. In addition, three bypass waveguides 250a, 250b, and 250c are used in the apparatus 200 to couple three pairs of switches, i.e., a first bypass waveguide 250a couples a first input switch 252a with a first output switch 254a, a second bypass waveguide 250b couples a second input switch 252b with a second output switch 254b, and a third bypass waveguide 250c couples a third input switch 252c with a third output switch 254c.

Each switch of the input switches 252a to 252c and output switches 254a to 254c is switchable between at least two states: a transmissive state and a reflective state. In the transmissive state, the input switches 252a to 252c pass through received optical modes such that they are sent into the universal interferometer 210, and the output switches 254a to 254c also pass through output optical modes such that some of them (e.g., output from 214a and 214b) can reach the residual interferometer 220 and some of them can be sent back to the input (e.g., output from 214c). In the reflective state, the input switches 252a and 252b reflect the input optical modes into the bypass waveguides 250a and 250b, which transmit the input optical modes to the output switches 254a and 254b. The output switches 254a and 254b also reflect the input optical modes into the residual interferometer 220, thereby allowing the input optical modes to bypass the universal linear interferometer 210. The output switch 254c, in the reflective state, reflects optical modes from the bypass waveguide 250c back to the input port 212c. In some embodiments, the switches 252a to 252c and 254a to 254c can include reconfigurable beamsplitters that can be configured to toggle between fully reflective and fully transmissive states (see, e.g., FIG. 3A).

The residual interferometer 220 includes three input ports 222a, 222b, and 222c (collectively referred to as input ports 222) and three output ports 224a, 224b, and 224c (collectively referred to as output ports 224). A second delay line 240 is used to optically couple the third output port 224c with the third input port 222c. In some embodiments, the residual interferometer 220 can include any other number of input ports (e.g., between about 3 and about 100). In addition, the second delay line 240 can also couple any output port with any input port.

Three bypass waveguides 260a to 260c are used in the apparatus 200 to allow input optical modes of the residual interferometer 220 to bypass the residual interferometer 220. To this end, three input switches 262a, 262b, and 262c are optically coupled to the three input ports 222a, 222b, and 222c, respectively. Three output switches 264a, 264b, and 264c are optically coupled to the three output ports 224a, 224b, and 224c, respectively. Each pair of input/output switches is coupled together by a corresponding bypass waveguide. In some embodiments, the bypass waveguides 250a to 250c and 260a to 260c can be used to implement an identity transformation characterized by an identity matrix (see more details below with reference to the operation of the apparatus 200).

In some implementations, the universal interferometer 210 includes M input ports 212 and the residual interferometer 220 includes (2M−3) input ports. In the universal interferometer 210, the first delay line 230 couples one output port in the output ports 214 with one input port from the input ports 212. The (M−1) output ports in the output ports 214 are coupled to (M−1) input ports in the input ports 222 of the residual interferometer 220. Accordingly, the residual interferometer 220 has (M−2) input ports out of the (2M−3) input ports and these input ports are not coupled to the output ports 214 of the universal interferometer 210. Instead, these (M−2) input ports are coupled to (M−2) output ports from the output ports 224. In these embodiments, the second delay line 240 can include (M−2) waveguides to achieve the coupling.

In some implementations, the universal interferometer 210 includes a network of interconnected reconfigurable beamsplitters (see, e.g., FIG. 3B) and is configured to implement an arbitrary unitary transformation on M input optical modes. The residual interferometer 220 includes a network of reconfigurable beamsplitters and swap gates. In some implementations, the swap gates can include reconfigurable beamsplitters that are configured in the transmissive state (see, e.g., FIG. 3C). In these embodiments, each beamsplitter in the universal interferometer 210 is reconfigurable such that the universal interferometer 210 is capable of implementing any unitary transformation. In contrast, some of the beamsplitters in the residual interferometer 220 have a fixed setting (at least for the purpose of implementing elimination-based decomposition) and therefore the residual interferometer 220 is configured to implement a subset of unitary transformations (i.e., residual transformations).

Figure 3A:
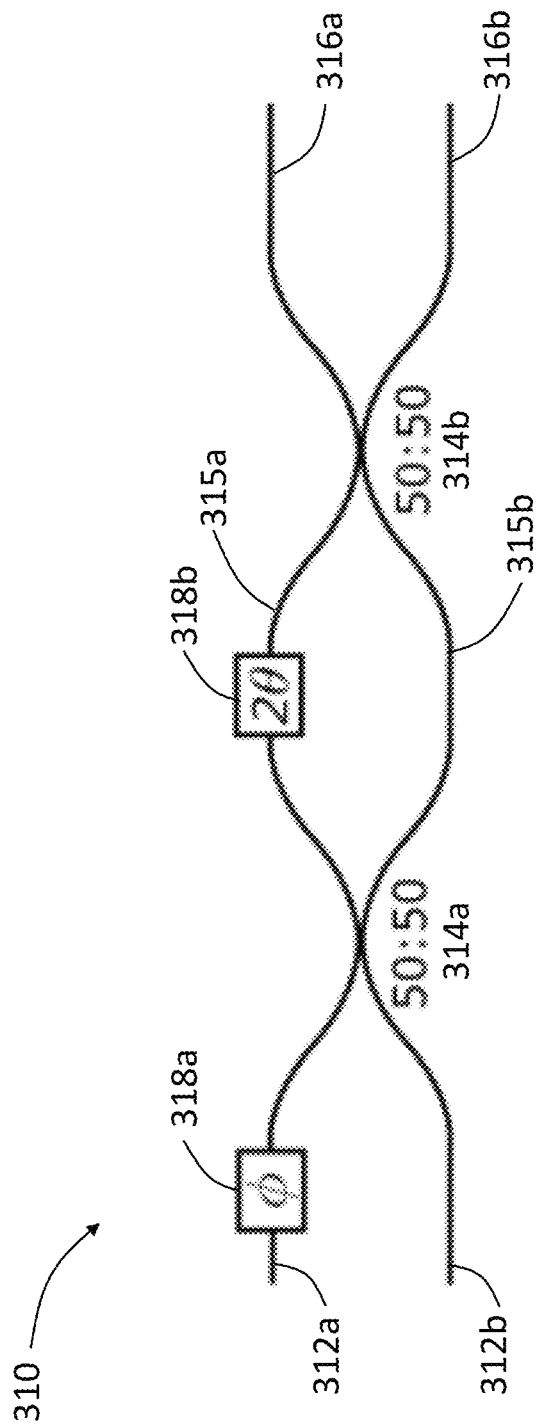
FIG. 3A is a schematic of a reconfigurable beamsplitter that can be used in an apparatus for implementing an arbitrary unitary transformation, according to an embodiment.

FIG. 3A is a schematic of a reconfigurable beamsplitter 310 that can be used in an apparatus (e.g., apparatus 200) for implementing an arbitrary unitary transformation, according to an embodiment. The beamsplitter 310 includes two input ports 312a and 312b and two output ports 316a and 316b. The input ports 312a/b and the output ports 316a/b are coupled by two 50:50 beamsplitters 314a and 314b connected by two interference arms 315a and 315b. A first phase shifter 318a is operatively coupled to the first input port 312a to implement a phase shift denoted as $\phi$, and a second phase shifter 318b is operatively coupled to the first interference arm 315a to implement a phase shift denoted as $2\theta$. By adjusting the amount of phase shifts applied by the first phase shifter 318a and the second phase shifter 318b (e.g., via the electro-optical effect or the thermo-electric effect), the reconfigurable beamsplitter 310 can achieve any given transmission ratio between the output optical modes and the input optical modes. For example, the reconfigurable beamsplitter 310 can be configured into the reflective state by setting $\theta=0$, $\phi=\pi/4$ and can be configured into the transmissive state by setting $\theta=0$, $\phi=0$.

With the above notation, the reconfigurable beamsplitter 310 can implement a transformation characterized by matrices expressed in Equations (2) and (3). In other words, the reconfigurable beamsplitter 310 can be used to implement transformations characterized by matrices $T_{mn}$ and $T_{mn}^{-1}$. Therefore, the reconfigurable beamsplitter 310 can be regarded as a U(2) (i.e., M=2) universal interferometer and can be used as the universal interferometer 210 in the apparatus 200 when the elimination-based decomposition factorizes a given matrix U(N) into U(2) matrices.

Figure 3B:
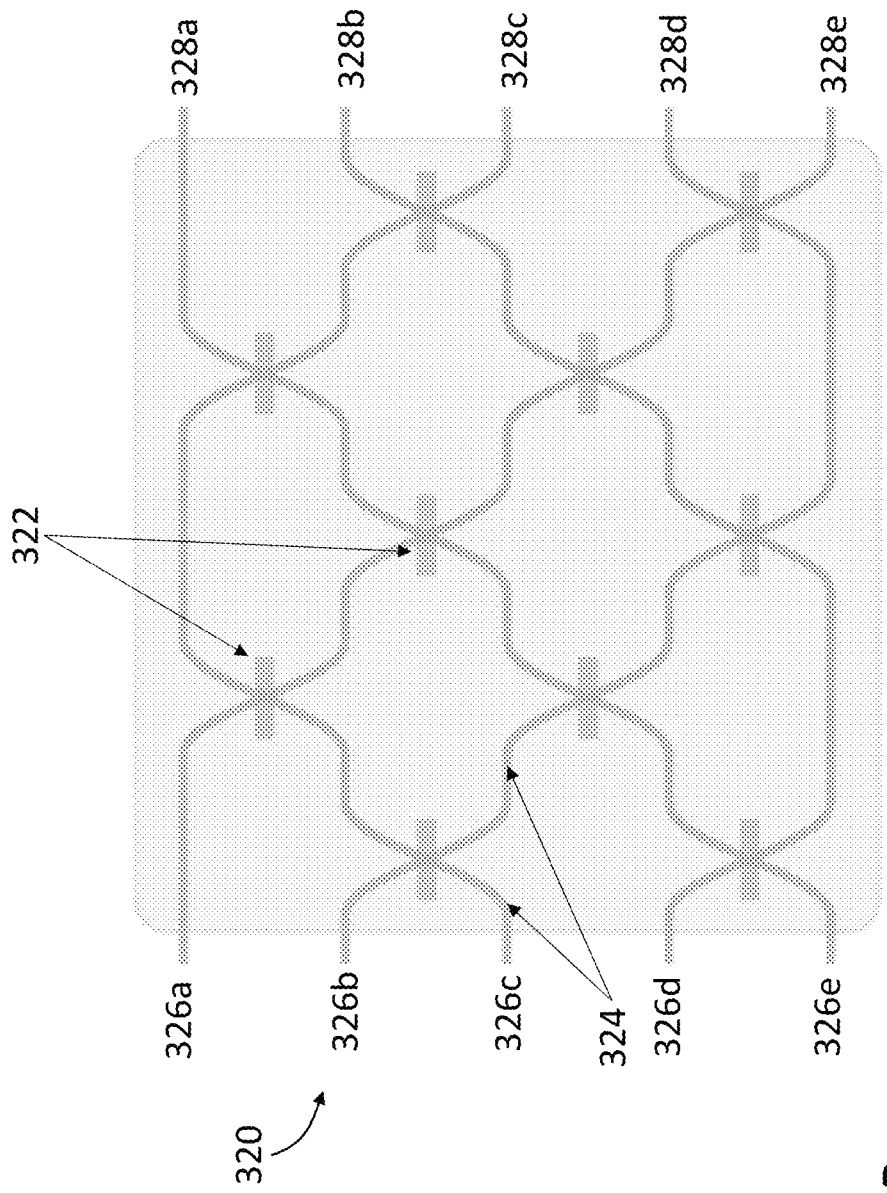
FIG. 3B is a schematic of a universal interferometer that can be used in an apparatus for implementing an arbitrary unitary transformation, according to an embodiment.

FIG. 3B shows a schematic of a universal interferometer 320 that can be used in an apparatus (e.g., apparatus 200) for implementing an arbitrary unitary transformation, according to an embodiment. The universal interferometer 320 includes a network of reconfigurable beamsplitters 322 (only two reconfigurable beamsplitters are labelled for illustrative purposes) interconnected by waveguides 324 (only two waveguides are labelled for illustrative purposes). Each reconfigurable beamsplitter in the network of reconfigurable beamsplitters 322 can be substantially identical to the reconfigurable beamsplitter 310 shown in FIG. 3A. The universal interferometer 320 also includes five input ports 326a to 326e and five output ports 328a to 328e. Therefore, the universal interferometer 320 is a U(5) universal interferometer (i.e., M=5). Any other appropriate number M can also be used to construct a general U(M) universal interferometer.

Figure 3C:
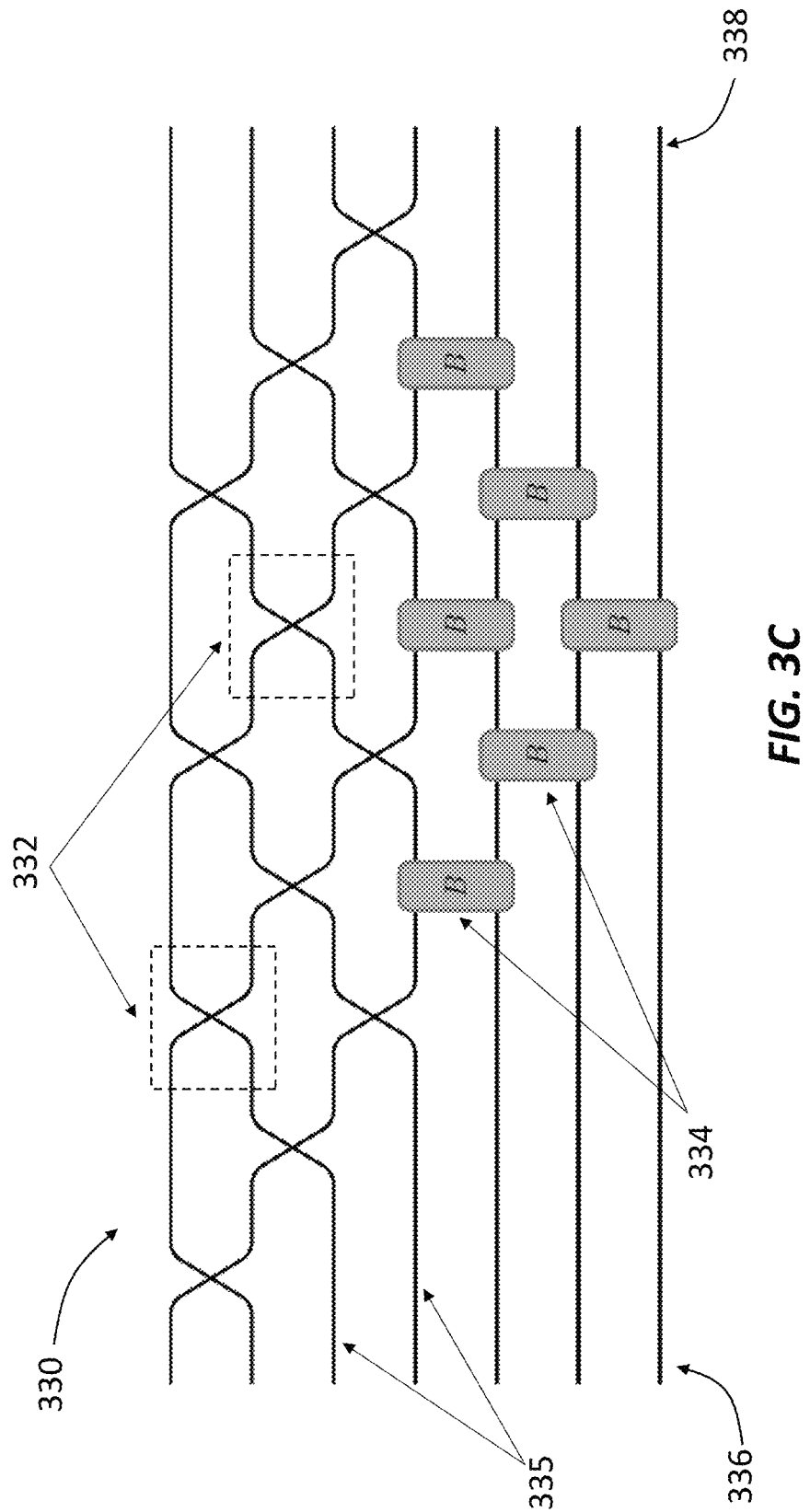
FIG. 3C is a schematic of a residual interferometer that can be used in an apparatus for implementing an arbitrary unitary transformation, according to an embodiment.

FIG. 3C shows a schematic of a residual interferometer 330 that can be used in an apparatus (e.g., apparatus 200) for implementing residual transformations, according to an embodiment. The residual interferometer 330 includes a network of swap gates 332 (only two swap gates are labelled for illustrative purposes) interconnected by waveguides 335 (only two waveguides are labelled for illustrative purposes) and a network of reconfigurable beamsplitters 334 (only two reconfigurable beamsplitters are labelled for illustrative purposes) interconnected by waveguides 335. In some embodiments, each swap gate in the network of swap gates 332 can be substantially similar to the reconfigurable beamsplitter 310 shown in FIG. 3A and configured in the transmissive state (e.g., $\theta=0$, $\phi=0$). In some embodiments, each reconfigurable beamsplitter in the network of reconfigurable beamsplitters 334 can be substantially identical to the reconfigurable beamsplitter 310 shown in FIG. 3A.

The residual interferometer 330 illustrated in FIG. 3C also includes seven input ports 336 and seven output ports 338, so the residual interferometer 330 is a U(7) residual interferometer (i.e., M=5 because 2M−3=7 under notations used in this description). This residual interferometer 330 can be used in combination with the universal interferometer 320 shown in FIG. 3B to form an optical circuit to implement elimination-based decompositions that factorize a given matrix into U(5) universal matrices and U(7) residual matrices.

In some embodiments, the residual interferometer 330 can include any other appropriate number of input ports and output ports, denoted as 2M−3. In these embodiments, the number of swap gates 332 in the residual interferometer 330 can be about (M−1)(M−2) and the number of reconfigurable beamsplitters 334 can be about (M−1)(M−2)/2. In some embodiments, M can be anywhere between 3 and 100 (e.g., about 3, about 5, about 10, about 20, about 30, about 50, or about 100, including any values and sub ranges in between).

Referring back to FIG. 2, the apparatus 200 can be used to implement a unitary transformation on N input optical modes via the elimination-based decomposition. In some embodiments, the number N of input optical modes can be written as: $N=k \times (M-1)+1$, where k is a positive integer. In some implementations, k can be about 3 to about 100 (e.g., about 3, about 5, about 10, about 20, about 30, about 50, or about 100, including any values and sub ranges in between). In some implementations, N can be about 7 to about 10,000 (e.g., about 7, about 10, about 20, about 30, about 50, about 100, about 500, about 1000, about 2000, about 5000, or about 10000, including any values and sub ranges in between).

Methods of operating the apparatus 200 to implement elimination-based decomposition can be illustrated with reference to FIG. 1 where a U(7) matrix is decomposed into six U(3) universal matrices and three residual matrices. But the methods can be extended to implement any other unitary matrix U(N).

The universal interferometer 210 in the apparatus 200 has M input ports 212, out of which M−1 input ports are coupled to light sources (now shown in FIG. 2) that provide the input optical modes. Therefore, the N input optical modes are divided into M−1 groups (also referred to as batches or sequences). Each group has k pulses, where k=(N−1)/(M−1), except the last group, which has k+1 pulses. In addition, each group of input optical modes is sent to the universal interferometer 210 via a corresponding input port. The time delay between adjacent pulses in each group is denoted as $\tau$ and this time delay is the same as the time delay applied by the first delay line 230 and by the second delay line 240.

For example, in FIG. 2, the input optical modes have seven pulses (i.e., N=7) and the universal interferometer 210 has three input ports (i.e., M=3). Therefore, the input optical modes are divided into two groups (i.e., M−1=2), where the first group has three pulses (i.e., k=3) and the second group has four pulses. The first group of input optical modes is sent into the universal interferometer 210 via the first input port 212a and the second group of input optical modes is sent into the universal interferometer 210 via the second input port 212b.

As described above, the elimination-based decomposition of the matrix $U_7$ results in six universal matrices and three residual matrices, implemented by the universal interferometer 210 and the residual interferometer 220, respectively. Each pass of the input optical modes through the universal interferometer 210 or the residual interferometer 220 is referred to as a layer. As illustrated in FIG. 1, the layers of universal interferometers include the sets of {E}, {A, G, D} and {I, B}, and the layers of residual interferometers include {F} and {H, C}. The interferometers A, G, D are diagonal layers (from bottom left to top right of circuit in FIG. 1). The interferometers in these layers are connected in a pattern suitable for the implementation illustrated in FIG. 2 because one output of interferometer A is connected to one input of interferometer G. In FIG. 2, this connection is performed by the waveguide 230. Similar arrangements are made for other interferometers.

The layers that have fewer than k universal transformations or fewer than k−1 residual transformations are padded with identity interferometers. Thus, for the example shown in FIG. 1, the universal layers become {II, II, E}, {A, G, D} and {I, B, II}, and the layers of residual interferometers become {II, F} and {H, C}, where II is the identity matrix.

To operate the apparatus 200, a single pulse is sent to the universal interferometer 210 via one of the first (M−1) input ports and the universal interferometer 210 is configured to route the single pulse to the first delay line 230 that sends the single pulse back to the input. For example, as illustrated in FIG. 2, the extra pulse in the second group is sent into the input port 212b. The universal interferometer 210 is configured to direct this single pulse to the last output 214c such that the first delay line 230 guides the single pulse back to the input port 212c.

Upon the arrival of the single pulse back to the input, (M−1) pulses in the input optical modes, each of which is from a corresponding group of pulses, are sent into the universal interferometer 210 via the first (M−1) input ports. Since the first delay line 230 is configured to apply a time delay equal to the time delay between adjacent pulses in each group, the single pulse can now interact with the (M−1) pulses within the universal interferometer 210 to implement part of the first layer.

In the example shown in FIG. 2, the first matrix to be implemented is an identity matrix. In some embodiments, the identity matrix can be implemented by the bypass waveguides 250a to 250c and 260a to 260c, i.e., bypassing the universal interferometer 210 or the residual interferometer 220. In some embodiments, the identity matrix can be implemented by the universal interferometer 210 by setting the beamsplitters in the universal interferometer 210 or the residual interferometer 220 into transmissive states.

After the interaction of the M pulses (including the first single pulse and the M−1 pulses), M−1 output optical modes are sent to the next interferometer (e.g., residual interferometer 220 in FIG. 2) and the last output optical mode is sent back to the input of the universal interferometer 210 via the first delay line 230. Upon the arrival of the last output optical mode, another (M−1) pulses from the input optical modes are sent to the universal interferometer 210, and the universal interferometer 210 is configured to implement the next transformation of the layer. In the example shown in FIG. 2, this transformation is also an identity matrix. This process can be continued until all the input optical modes are sent into the universal interferometer 210 to complete the first layer. For example, in the example shown in FIG. 2, the first layer (after padding) includes {II, II, E}.

The operation of the residual interferometer 220 is similar. For example, the residual interferometer 220 is configured to send back (M−2) output optical modes back to the input ports 222 for each round of input optical modes.

The operation of the apparatus 200 described herein allows the input optical modes (except the first M−1 and the last M−1 optical modes) to propagate through the same number of optical elements upon the completion of a given unitary transformation. The first M−1 and the last M−1 optical modes can propagate through fewer optical elements (e.g., up to 50% fewer). In some embodiments, the number N can be substantially greater than M (e.g., when k is greater than 10). In these embodiments, a great majority of the input optical modes (i.e., N−2M+2 of N) propagate through the same number of optical elements, thereby leading to balanced optical losses.

The apparatus 200 can be operated in at least two ways to implement multiple layers in the elimination-based decomposition. In some implementations, multiple units, each of which is substantially similar to the apparatus 200, can be connected in series to implement the elimination-based decomposition. In these implementations, each unit (or part of a unit) is configured to implement one universal/residual transformation illustrated in FIG. 1. For example, a first unit can be configured as the combination of the universal interferometer 120E and the residual interferometer 120F, and a second unit can be configured as the combination of the universal interferometer 120G and the residual interferometer 120H.

In some implementations, the apparatus 200 can be used repeatedly to realize the elimination-based decomposition. In these implementations, the output optical modes from the apparatus 200 are send back to the input of the apparatus 200 for multiple round trips, each of which can be configured to implement a respective U(M) universal transformation and/or U(2M−3) residual transformation.

In some embodiments, the methods of operating the apparatus 200 can be performed by one or more controllers (not shown in FIG. 2). The controller can include any suitable processing device configured to run or execute a set of instructions or code (e.g., stored in the memory) such as a general-purpose processor (GPP), a field programmable gate array (FPGA), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

The following description refers to the cosine-sine decomposition (CSD), which factorizes a unitary matrix into three unitary matrices in a manner similar to singular value decomposition. More specifically, consider a given (m+n)× (m+n) unitary matrix $U_{m+n}$ and given integers m, n. The CSD finds unitary matrices $\mathbb{L}_{m+n}$, $\mathbb{S}_{m+n}$, $\mathbb{R}_{m+n}$, that factorize $U_{m+n}$ according to:

$$U_{m+n} = \begin{cases} \mathbb{L}_{m+n}(S_{2m} \oplus \mathbb{1}_{n-m})\mathbb{R}_{m+n}, & m \le n \\ \mathbb{L}_{m+n}(\mathbb{1}_{m-n} \oplus S_{2n})\mathbb{R}_{m+n}, & m > n \end{cases} \quad (6)$$

where $\mathbb{L}_{m+n}$ and $\mathbb{R}_{m+n}$ are block-diagonal:

$$\mathbb{L}_{m+n} = \begin{pmatrix} L_m & 0 \\ \hline 0 & L'_n \end{pmatrix}, \mathbb{R}_{m+n} = \begin{pmatrix} R_m^+ & 0 \\ \hline 0 & R_n'^+ \end{pmatrix} \quad (7)$$

with m×m and n×n blocks whose dimensions are denoted in the subscripts of the matrices.

Without loss of generality, it can be assumed that m≤n. The matrix $\mathbb{S}_{2m}$ is referred to as an orthogonal cosine-sine (CS) matrix, which comprises four diagonal blocks, i.e., $\mathbb{S}_{2m}$ is in the form:

$$\mathbb{S}_{2m} \equiv \mathbb{S}(\theta_1, \ldots, \theta_m) \quad (8)$$

$$\stackrel{def}{=} \begin{pmatrix} \cos\theta_1 & & & \sin\theta_1 & & \\ & \ddots & & & \ddots & \\ & & \cos\theta_m & & & \sin\theta_m \\ \hline -\sin\theta_1 & & & \cos\theta_1 & & \\ & \ddots & & & \ddots & \\ & & -\sin\theta_m & & & \cos\theta_m \end{pmatrix}$$

where the dots represent more cosine and sine terms and the remaining entries are all zero.

The CSD can be used for any M, N such that N=lM for integer-valued l. With this notation, the decomposition receives as input an U(N) matrix and returns a sequence of arbitrary U(M) transformations that implement arbitrary unitary transformations and specialized 2M-mode CS transformations that implement CS transformations characterized by the matrix in Equation (8).

For illustrative purposes only, the following description uses the decomposition of a U(12) matrix into U(3) matrices as an example (i.e., N=12, and M=3). The methods can be extended to any other unitary matrix. The decomposition proceeds in two stages. In the first stage, a suitably ordered nulling procedure decomposes the given matrix into 2M×2M matrices. Consider a general unitary matrix:

$$U_{12} = \begin{pmatrix} * & D & D & D & C & C & C & A & A & A & A & A \\ & * & D & D & D & C & C & C & A & A & A & A \\ & & * & D & D & D & C & C & C & A & A & A \\ & & & * & D & D & E & B & B & B & A & A \\ & & & & * & D & E & E & B & B & B & A \\ & & & & & * & E & E & E & B & B & B \\ & & & & & & * & E & E & F & B & B \\ & & & & & & & * & E & F & F & B \\ & & & & & & & & * & F & F & F \\ & & & & & & & & & * & F & F \\ & & & & & & & & & & * & F \\ & & & & & & & & & & & * \end{pmatrix} \quad (9)$$

where the different capital letters represent different groups of elements to be nulled as well as the order of nulling. For example, the elements in the first group labelled A are nulled by $T_{mn}^{-1}$ matrices acting from the right.

Figure 4:
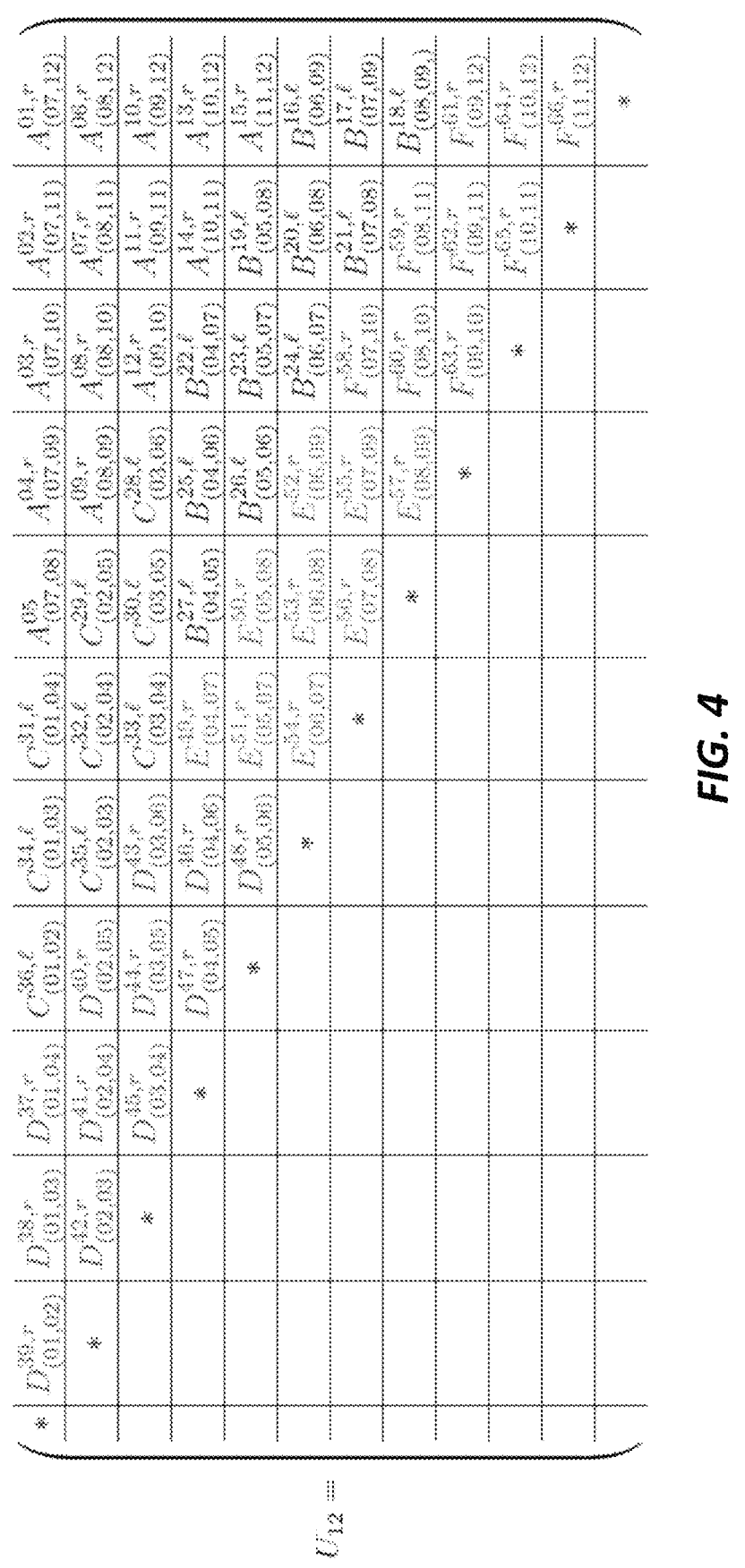

FIG. 4 is a diagram illustrating the CSD of a 12-mode unitary matrix $U_{12}$, according to an embodiment. The diagram labels each element in the matrix $U_{12}$ with a capital letter, a superscript, and a subscript to indicate the method and order of nulling that element. More specifically, the capital letters (e.g., A to F) indicate the group to which each element belongs. The subscript (m, n) indicates the matrix $T_{m,n}$ or $T_{mn}^{-1}$ that is used to null this element. The superscript (l or r) indicates whether the nulling is performed from the left (l) using a $T_{mn}$ matrix or from the right (r) using a $T_{mn}^{-1}$ matrix.

The $T_{mn}$ matrices and/or $T_{mn}^{-1}$ matrices used to null elements in a group of elements can be combined together to form a single unitary matrix. For example, the matrices used to null elements in group A (i.e., located on the upper right triangular block in $U_{12}$ illustrated in FIG. 4) can be combined together into a single U(6) transformation acting on the last six modes from the twelve input optical modes (i.e., modes 7 to 12) as:

$$U_{12}A_{7\ldots12}^{-1} = U_{\overline{A}} \quad (10)$$

where $A_{7\ldots12}$ denotes a unitary transformation acting on modes 7 through 12.

The elements in groups B and C are nulled by multiplying the matrix $U_{12}$ from the left by $T_{mn}$ matrices. Similar to the elimination-based decomposition described above, this alternation between nulling from the left and nulling from the right leads to the rectangular structure of the optical circuit that implements this decomposition. The $T_{mn}$ matrices used to null B and C elements are then combined again into U(6) transformations $B_{4\ldots9}$ and $C_{1\ldots6}$ as:

$$C_{1\ldots6}^{-1}B_{4\ldots9}^{-1}U_{12}A_{7\ldots12}^{-1} = U_{\overline{C}} \quad (11)$$

Finally, the elements labelled D through F are nulled, again using $T_{mn}^{-1}$ matrices to obtain:

$$C_{1\ldots6}^{-1}B_{4\ldots9}^{-1}U_{12}A_{7\ldots12}^{-1}D_{1\ldots6}^{-1}$$
$$E_{4\ldots9}^{-1}F_{7\ldots12}^{-1} = \mathbb{D}_{12} \quad (12)$$

Or equivalently:

$$U_{12} = B_{4\ldots9}C_{1\ldots6}F_{7\ldots12}E_{4\ldots9}D_{1\ldots6}A_{7\ldots12} \quad (13)$$

where the diagonal phases are absorbed into the unitary U(6) transformations.

Figure 5:
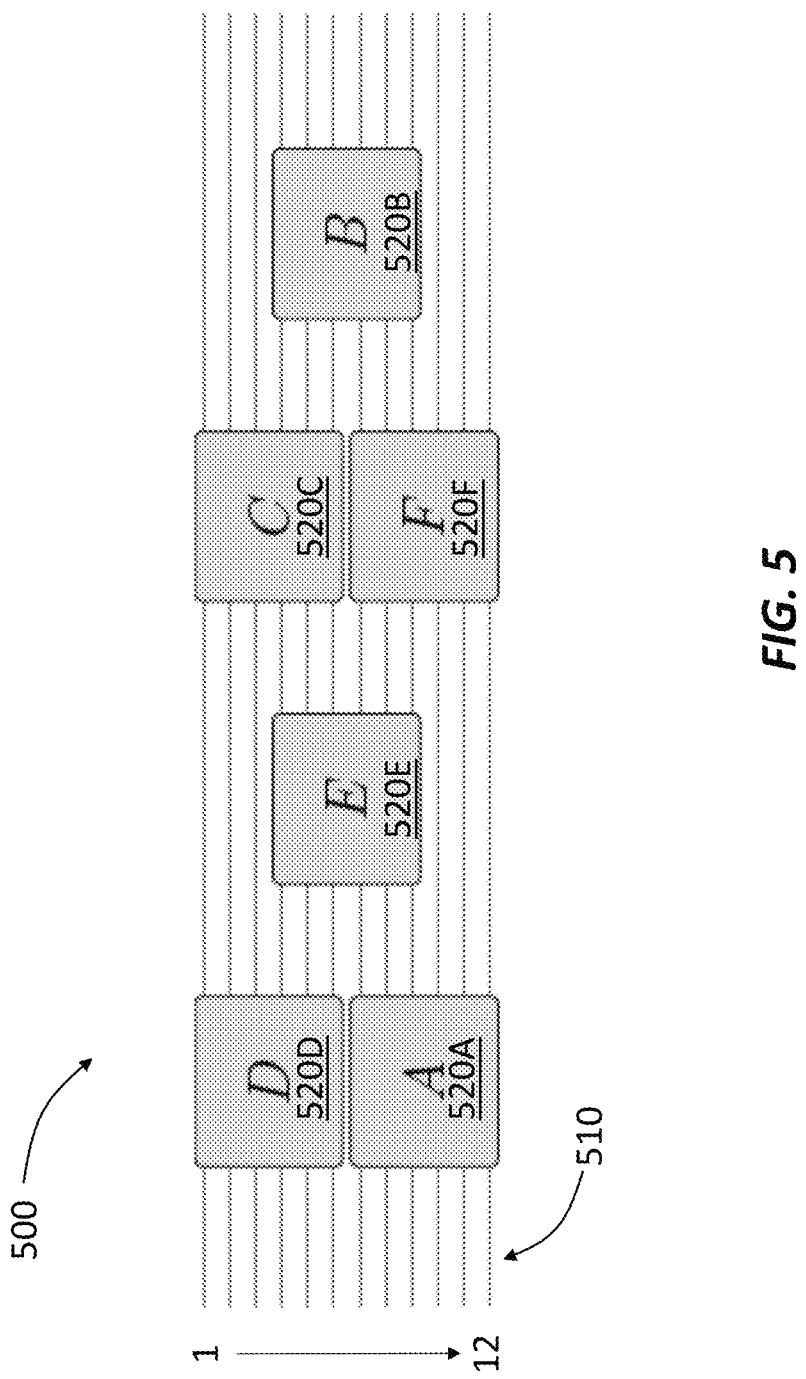
FIG. 5 is a diagram illustrating a method of decomposing a 12-mode unitary matrix $U_{12}$ into six 6-mode unitary matrices $U_6$ via the CS decomposition, according to an embodiment.

FIG. 5 is a diagram 500 illustrating the decomposition of a 12-mode unitary matrix $U_{12}$ into six 6-mode unitary matrices $U_6$ via the CS decomposition, according to an embodiment. The diagram 500 illustrates the decomposition in Equation (13). In some embodiments, the diagram 500 can be used to construct an optical circuit to implement the CS decomposition in Equation (13). In these embodiments, the diagram 500 includes 12 input ports 510 (labeled as 1→12) to receive 12 input optical modes. The diagram 500 also includes six 6-mode interferometers 520A through 520F. The interferometer 520A is configured to implement transformations characterized by the matrix $A_{7\ldots12}$ and therefore is coupled to input ports 7 to 12. The interferometer 520B is configured to implement transformations characterized by the matrix $B_{4\ldots9}$ and therefore is coupled to input ports 4 to 9. Other interferometers 520C to 520F are arranged in the diagram 500 in a similar manner.

In the decomposition illustrated in FIG. 5, the unitary matrix $U_{12}$ is factorized into six matrices 520A through 520F. These six matrices already lead to a rectangular structure since at least 6 input optical modes out of the 12 input optical modes traverse the same number of optical elements in the diagram 500. But not all of these six matrices characterize universal transformations because some of them include fewer than the minimal number of $T_{mn}$ parameters (i.e., 6) to achieve universality. The second stage of the decomposition is configured to remove this redundancy in the number of optical gates in the diagram 500.

The second stage of decomposition begins by identifying that the N modes are partitioned into groups of M modes each, with the 2M-mode transformations obtained above acting on two nearest partitions. In the current specific example for M=3, the modes are partitioned into subsets {1, ..., 3|4, ..., 6|7, ..., 9|10, ..., 12} of three-mode elements, and the transformations obtained above act on the six-mode sets {1, ..., 6|4, ..., 9|7, ..., 12}.

The next step is to further decompose each of these transformations using the CS decomposition with the parameters m=n=M, which is equal to 3 in the current example. The action of CS decomposition on each of the transformations leads to a sequence of two types of unitary matrices: M-mode unitary matrices acting on individual partitions and 2M-mode CS matrices acting on neighboring partitions. Because the M-mode unitary matrices act only on individual partitions, those matrices that act sequentially on the same partition can be merged into a single U(M) transformation. This merge removes the above-mentioned redundancy and reduces the circuit depth of the resulting architecture.

Figure 6:
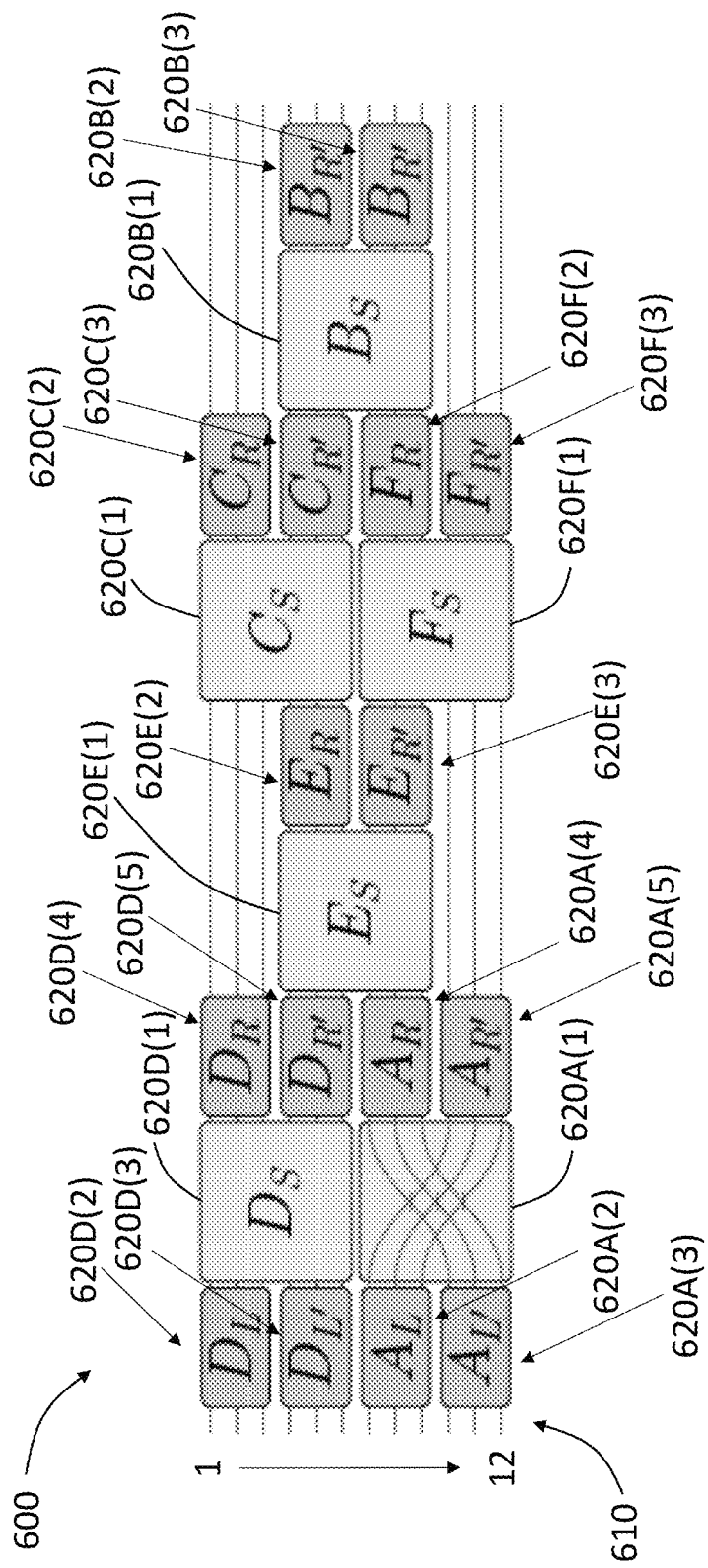
FIG. 6 is a diagram illustrating a method of decomposing a 12-mode unitary matrix $U_{12}$ into universal matrices and CS matrices via the CS decomposition, according to an embodiment.

FIG. 6 is a diagram 600 illustrating the decomposition of a 12-mode unitary matrix $U_{12}$ into universal matrices and CS matrices via the CS decomposition, according to an embodiment. In some embodiments, the diagram 600 can be used to construct an optical circuit to implement the CS decomposition. In these embodiments, the diagram 600 includes 12 input ports 610 (labeled as 1→12) to receive 12 input optical modes. In addition, the diagram 600 also includes six CS matrices 620A(1) to 620F(1) and sixteen universal matrices (i.e., 620A(2) to 620A(5), 620D(2) to 620D(5), 620E(2), 620E(3), 620C(2), 620C(3), 620F(2), 620F(3), 620B(2), and 620B(3)). Each CS matrix acts on six neighboring modes from the input optical modes and each universal matrix acts on three neighboring modes from the input optical modes.

Compared to the diagram 500 in FIG. 5, each matrix 520A to 520D is further decomposed into a U(2M) CS matrix and several U(M) universal matrices, where M=3. For example, the matrix 520A is decomposed into the CS matrix 620A(1) and four universal matrices 620A(2) to 620A(5). The CS matrix 620A(1) acts on six modes (i.e., modes 7-12) and each universal matrix 620A(2) to 620A(5) acts on three modes (e.g., 620A(2)/(5) acts on modes 7-9 and 620A(3)/(5) acts on modes 10-12). In another example, the matrix 520E in the diagram 500 is decomposed into a CS matrix 620E(1) and two universal matrices 620E(2) and 620E(3). Other matrices in the diagram 500 are decomposed in similar manner.

The CS decomposition illustrated in FIG. 6 can be used as a basis of a variety of implementations. In some implementations, the CS decomposition can be used in a purely spatial implementation. For instance, in the example illustrated in FIG. 6 (i.e., N=12 and M=3), the implementation involves realizing a SU(12) transformation by combining three-mode interferometers (i.e., tritters) and specialized six-mode CS interferometers, each of which can be realized using three beamsplitters. Such an architecture can be useful in situations where spatial interferometers are limited in the number of modes they can act on, but they can be connected together via low-loss interconnects.

In some implementations, the CS decomposition illustrated in FIG. 6 can be used in a hybrid internal-spatial implementation. These implementations involve combining: (1) units enacting universal unitary transformations on M=3 dimensional internal degrees of freedom (e.g., polarization, time bins, temporal modes, or orbital angular momentum) and (2) units implementing the CS transformation.

Figure 7:
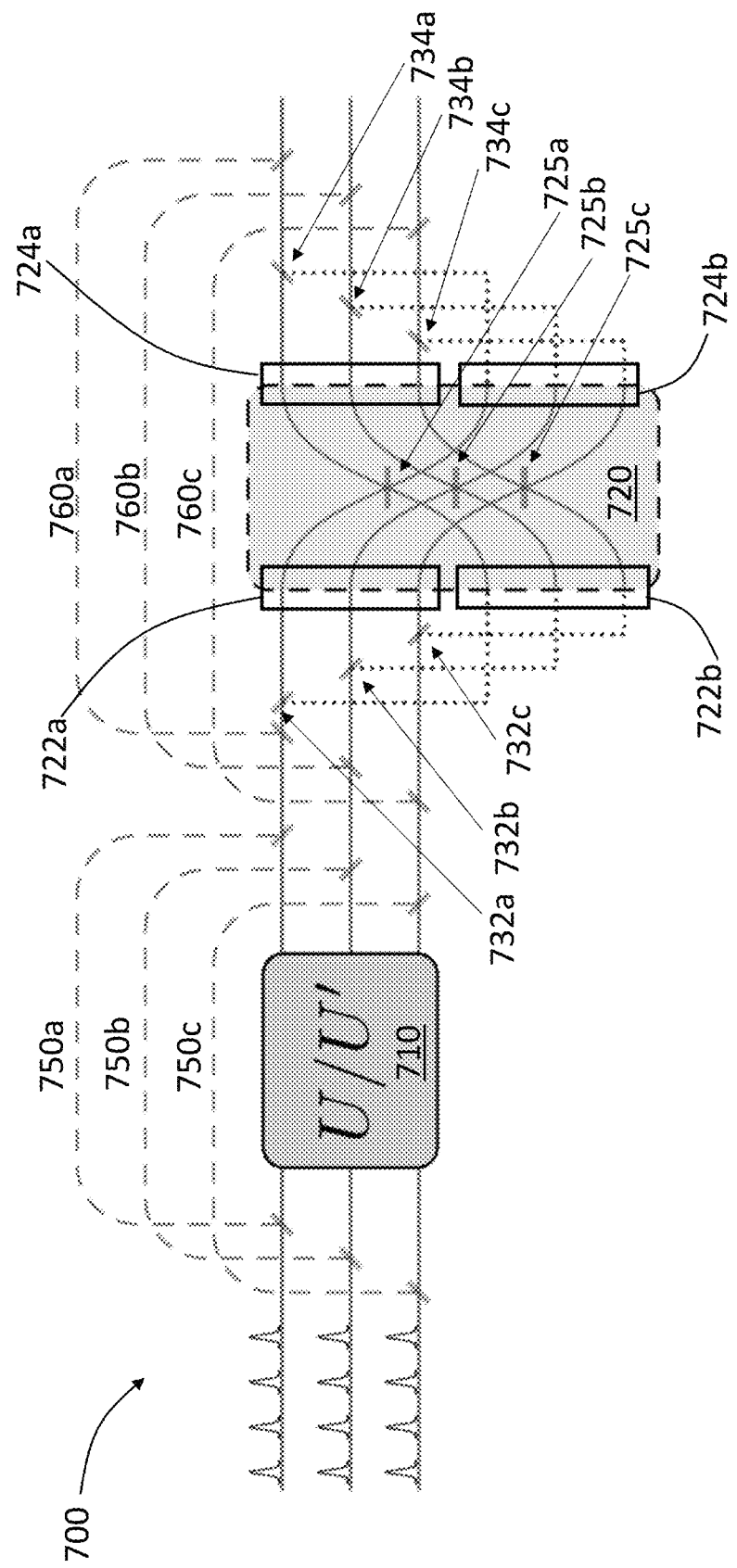
FIG. 7 is a schematic of an apparatus for implementing CS decomposition, according to an embodiment.

In some implementations, a hybrid spatial-temporal implementation can be used to realize the CS decomposition. FIG. 7 shows a schematic of an apparatus 700 for hybrid spatial temporal implementation of the CS decomposition, according to an embodiment. The apparatus 700 includes a universal interferometer 710 and a CS interferometer 720. The universal interferometer 710 can be substantially similar to the universal interferometer 210 shown in FIG. 2. The CS interferometer 720 is configured to implement transformations characterized by CS matrices in the form of Equation (8).

The apparatus includes three bypass waveguides 750a to 750c that can be configured to guide input optical modes of the universal interferometer 710 to bypass the universal interferometer 710 (e.g., to implement a transformation characterized by an identity matrix). The apparatus also includes three bypass waveguides 760a to 760c that can be configured to guide input optical modes of the CS interferometer 720 to bypass the CS interferometer 720. The operation of the bypass waveguides 750a to 750c and 760a to 760c can be substantially identical to the operation of the bypass waveguides 250a to 250c and 260a to 260c in the apparatus 200 and described above.

For illustrative purposes only, the universal interferometer 710 is a three-mode interferometer and the CS interferometer 720 is a six-mode interferometer. In some instances, the universal interferometer 710 can be an M-mode interferometer and the CS interferometer 720 can be a 2M-mode interferometer. In these instances, the number of input ports of the CS interferometer 720 is twice the number of input ports of the universal interferometer 710.

The CS interferometer 720 includes three reconfigurable beamsplitters 725a, 725b, and 725c. In addition, the input ports of the CS interferometer 720 can be divided into a first group 722a and a second group 722b, each of which has three input ports. The output ports of the CS interferometer 720 can also be divided into a first group 724a and a second group 724b, each of which has three output ports. Three input switches 732a, 732b, and 732c are disposed in the beam paths between the output ports of the universal interferometer 710 and the input ports of the CS interferometer 720. These switches 732a to 732c can be configured into at least a transmissive state to pass received optical modes and a reflective state to reflect received optical modes.

During the transmissive state, the output optical modes of the universal interferometer 710 are sent to the first group of input ports 722a of the CS interferometer 720. During the reflective state, the output optical modes of the universal interferometer 710 are sent to the second group of input ports 722b of the CS interferometer 720. Each reconfigurable beamsplitter 725a to 725c is configured to receive a first input from one input port in the first group of input ports 722a and a second input from one input port in the second group of input ports 722b. In addition, each reconfigurable beamsplitter 725a to 725c is configured to generate a first output sent to one output port in the first group of output ports 724a and a second output sent to one output port in the second group of output ports 724b.

Three output switches 734a, 734b, and 734c are disposed in the beam paths of the output optical modes of the CS interferometer 720 and can be configured at least into a transmissive state and a reflective state. In the transmissive state, the output switches 734a to 734c are configured to pass through output optical modes sent out from the first group of output ports 724a of the CS interferometer 720 for further processing. In the reflective state, the output switches 734a to 734c are configured to reflect output optical modes sent out from the second group of output ports 724b of the CS interferometer 720 for further processing. In some embodiments, the switches 732a to 732c and 734a to 734c can be substantially similar to the switches 252a to 252c and 254a to 254c in the apparatus 200 and described above.

Methods of operating the apparatus 700 to implement a CS decomposition can be illustrated with reference to FIG. 6 where a $U_{12}$ matrix is decomposed into six $U_6$ CS matrices and sixteen $U_3$ universal matrices. But the methods can be extended to implement any other unitary matrix U(N). For illustrative purposes only, the description herein considers N=12 and M=3, so l=M/N=4.

The N input optical modes are divided into M groups (e.g., 12 pulses divided into 3 groups for N=12 and M=3), each of which has four pulses and are sent into the universal interferometer 710 via a corresponding input port of the universal interferometer 710. The delay between adjacent pulses in each group is substantially identical to the delay introduced by the distance between the input switches 732a to 732c and the second group of input ports 722b.

Each pass of the input optical modes through the universal interferometer 710 or the CS interferometer 720 implements a layer of universal or CS matrices. For the case of the optical circuit illustrated in FIG. 6, the layers of universal interferometers are the sets of gates: $\{A_{L'}, A_L, D_L, D_{L'}\}$, $\{A_{R'}, A_R, D_{R'}, D_R\}$, $\{E_{R'}, E_R\}$, $\{F_{R'}, F_R, C_{R'}, C_R\}$, and $\{B_{R'}, B_R\}$ and the layers of CS interferometers are $\{A_S$ (i.e., 620A(1)), $D_S\}$, $\{E_S\}$, $\{F_S, C_S\}$ and $\{B_S\}$. The layers that have fewer than l universal interferometers or fewer than l/2 CS interferometers are padded with identity interferometers acting on M modes each. After the padding, the universal layers include: $\{A_{L'}, A_L, D_L, D_{L'}\}$, $\{A_{R'}, A_R, D_{R'}, D_R\}$, $\{II, E_{R'}, E_R, II\}$, $\{F_{R'}, F_R, C_{R'}, C_R\}$, and $\{II, B_{R'}, B_R, II\}$ and the layers of CS interferometers are $\{A_S, D_S\}$, II $E_S$II}, $\{F_S C_S\}$ and II, $B_S$, II}. In addition, no more than two padding identity interferometers are used in each layer irrespective of the values of N and M. When two padding interferometers are used, one padding interferometer is disposed at the beginning of the layer and the other padding interferometer is disposed at the end of the layer.

In some instances, the operation of the apparatus 700 proceeds as follows. First, a set of M pulses, each of which is from a group in the M groups, is sent to the M input ports of the universal interferometer 710. The first M-mode unitary transformation of the first layer is implemented by the universal interferometer 710 (i.e., $A_{L'}$ in the example shown in FIG. 6).

The universal interferometer 710 is then configured to implement the next transformation $A_L$ on the next M pulses that are sent to the input ports. Each pulse of the M pulses is also from a distinct group in the M groups of input optical modes. This process continues until the universal interferometer 710 completes all the transformations in the first layer.

The output optical modes of the universal interferometer 710 are directed into the CS interferometer 720, which is configured to implement the first CS layer on 2M pulses that arrive in groups of M pulses at two different arrival times. More specifically, the first group of M pulses includes output optical modes of the universal interferometer 710 that are transmitted through by the input switches 732a to 732c and sent to the first group of input ports 722a of the CS interferometer 720. The second group of M pulses includes output optical modes of the universal interferometer 710 that are reflected by the input switches 732a to 732c and sent to the second group of input ports 722b of the CS interferometer 720.

The two groups of M pulses can arrive at the input ports 722a and 722b simultaneously by matching the time delay between adjacent pulses in the input optical modes and the time delay introduced by the distance between the input switches 732a to 732c and the second group of input ports 722b. Upon arrival of the two groups of M pulses, the CS interferometer 720 is configured to act on these 2M pulses to implement transformations in the first CS layer (e.g., transformations $\{A_S, D_S\}$ in the example illustrated in FIG. 6).

The apparatus 700 can be operated in at least two ways to implement multiple layers in the CS decomposition. In some implementations, multiple units, each of which is substantially similar to the apparatus 700, can be connected in series to implement the CS decomposition. In these implementations, each unit (or part of a unit) is configured to implement one universal/CS transformation illustrated in FIG. 6.

In some implementations, the apparatus 700 can be used repeatedly to realize the CS decomposition. In these implementations, the output optical modes from the apparatus 700 are sent back to the input of the apparatus 700 for multiple round trips, each of which can be configured to implement a respective U(M) universal transformation and/or U(2M) CS transformation.

As in the previous elimination-based decomposition, this CS decomposition provides a factor of two improvement in the maximum number of interferometers that an input optical mode traverses for realizing a given unitary transformation. Moreover, such improvement can be realized without access to low-loss identity interferometers because only a constant number of padding identity interferometers (i.e., two) is used for each layer in the decomposition.

As described herein, the two decomposition schemes (i.e., elimination-based decomposition and CS decomposition) to realize the modular approach are more cost effective compared to known approaches for implementing an arbitrary unitary transformation. The cost analysis of these two schemes can be conducted as follows.

In general, the number of optical elements to implement a unitary transformation of input optical modes depends on the degrees of freedom of the input optical modes that are used for the implementation. For example, in a purely spatial implementation, i.e., where multiple spatial interferometers are connected together, the relevant number for cost analysis includes the number of beamsplitters and phase shifters. In this purely spatial setting, both the elimination-based decomposition and the CS decomposition use N(N−1)/2 physical beamsplitters and N(N−1)/2 physical phase shifters.

In the hybrid spatial-temporal configuration, the metric for cost analysis includes the number of passes through beamsplitters and phase shifters because each pass leads to potential optical losses. In this configuration, both the elimination-based decomposition and the CS decomposition involve N(N−1)/2 passes through beamsplitters and N(N−1)/2 passes through reconfigurable phase shifters. Therefore, both decompositions can lead to optimal architectures in terms of optical elements or passes through optical elements.

The cost analysis can also consider the circuit depth of optical circuits implementing the decompositions in terms of, for example, the number of interferometers that each input optical mode traverses through (universal or otherwise). It is usually beneficial to have a small circuit depth because larger depths can lead to smaller transmissivities per photon, which can scale exponentially towards zero with the circuit depth.

For comparison, a triangular architecture that implements a CS decomposition is considered first. In a triangular architecture for parameters M, N, and l=N/M, the resulting circuit depth is (2l−2) for universal unitary transformations and (2l−3) for CS transformations. In contrast, the rectangular architecture described herein for CS decomposition has a circuit depth of (L+1) for universal transformations and l for CS transformations, thereby achieving about a factor of two improvement.

The circuit depths in the rectangular structure described herein can be optimal for an architecture that employs M-mode universal and 2M-mode CS interferometers. To illustrate this point, observe that the set of all the modes is partitioned into l subsets {1, 2, . . . , M|M+1, M+2, . . . , 2M| . . . |N−M+1, N−M+2, . . . , N}, each of which has M modes. Universal interferometers act only within one of the l subsets. In between the action of each CS matrix, only a single universal M-mode matrix acts on each subset. Modes from each subset mix with those of their nearest neighboring subset at the first possible occasion via CS matrices. Therefore, this architecture is optimal in terms of the 2M-mode CS and M-mode universal interferometers that are used to implement the given transformation.

Similar conclusions can also be made for the elimination-based decomposition. For comparison, the cost analysis first considers the triangular architecture for N input optical modes, where N=k(M−1)+1. The optical circuit in a triangular architecture has a circuit depth of (2k−1) for universal interferometers and (2k−3) for residual interferometers. In contrast, the rectangular architecture described herein has a circuit depth of (k+1) for universal interferometers and k for residual interferometers. Therefore, the elimination-based decomposition also provides about a factor of two improvement in circuit depth.

The cost analysis can also be conducted in terms of M-mode universal matrices and (2M−3)-mode residual matrices. More specifically, an elimination-based scheme divides the set of all modes into overlapping subsets {1, 2, . . . , M+1|M+1, M+2, . . . , 2M+1| . . . |N−M, N−M+1, . . . N}, and each subset has (M+1) elements. These subsets are acted upon by universal interferometers and they mix with their neighboring subsets at the first possible occasion as well.

One or more embodiments of methods presented herein achieve significantly enhanced fidelities, as compared with known methods, when implementing linear optics transformations. The enhanced fidelities can result, for example, from each of the modes passing through a similar number of optical elements when the smaller interferometers are combined together in a rectangular pattern. This rectangular structure is in contrast to the triangular structure of previous approaches, in which some of the modes pass through many more interferometers than other modes.

Figure 8:
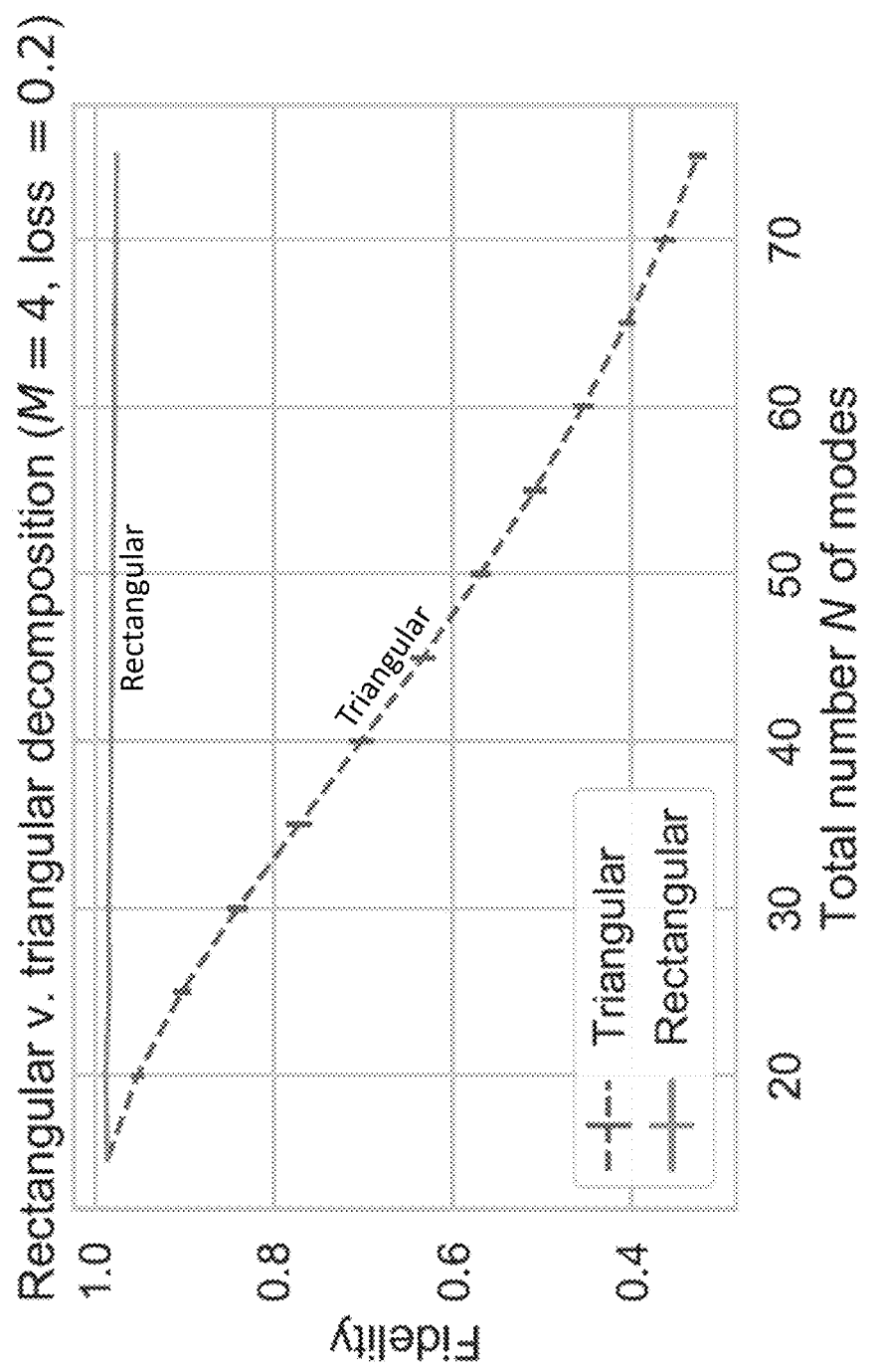
FIG. 8 is a plot of fidelity versus total number of modes, comparing rectangular and triangular decomposition and showing how performance improvement scales with the number of modes, according to some embodiments.
Figure 9:
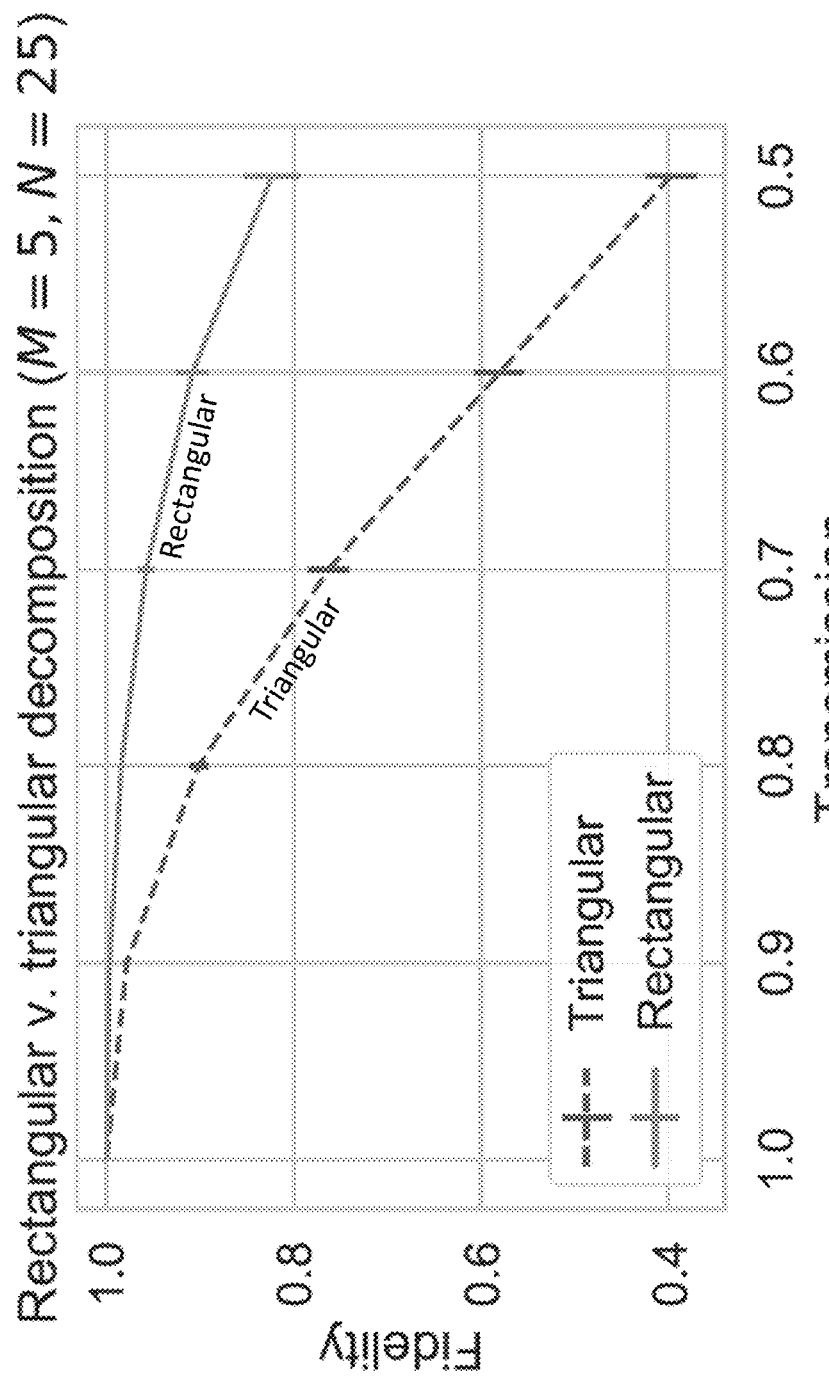
FIG. 9 is a plot of fidelity versus transmission, comparing rectangular and triangular decomposition and showing how performance improvement scales with decreasing transmission values, according to some embodiments.

A comparison of the fidelities of circuit designs set forth herein and those of known triangular approaches, is plotted in FIGS. 8 and 9. To obtain the fidelity plots, random N×N unitary matrices U were drawn from the Haar measure, which were then decomposed into a sequence of U(M) transformations according to the procedure described above. A uniform loss was applied to each of the individual interferometers. The effective experimental unitary transformation $U_{lossy}$ was then obtained by multiplying the U(M) transformations. The fidelity of the lossy unitary transformation can be quantified as $$F = \left| \frac{tr(U^\dagger U_{lossy})}{\sqrt{Ntr(U_{lossy}^\dagger U_{lossy})}} \right|^2,$$

which is insensitive to overall uniform loss. Such a measure is relevant in settings where post-selection can be performed, in which case any overall uniform loss can be neglected. This fidelity was then averaged over the Haar measure by sampling one hundred random unitary matrices for each data point of FIGS. 8 and 9. More specifically, FIG. 8 depicts the scaling of the average fidelity as a function of the total number N of modes of the system. Each module acts on M=4 modes and adds 20% loss, which is assumed to act uniformly on each of the modes of the module. FIG. 9 depicts the scaling of average fidelity with transmission for N=25 and M=5. The error bars (sometimes smaller than plot line-width) represent a spread of fidelity over two standard deviations, as estimated by sampling over one hundred unitary matrices from the Haar measure.

Methods set forth herein, according to some embodiments, use lower circuit depths and rectangular structures, and thus can provide substantially enhanced fidelities across different values of N and loss when implementing linear optical transformations, as contrasted with known triangular decompositions.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
   a first optical circuit including a network of interconnected interferometers and configured to perform an M-mode universal transformation on N input optical modes that are divided into (M−1) groups of pulses, the first optical circuit including:
   M input ports, each input port of a first (M−1) input ports from the M input ports configured to receive a corresponding group of pulses in the (M−1) groups of pulses;
   M output ports; and
   a first delay line configured to couple an Mth output port in the M output ports with an Mth input port in the M input ports; and
   a second optical circuit in optical communication with the first optical circuit and configured to perform an (2M−3)-mode residual transformation on the N input optical modes, the second optical circuit including a network of beamsplitters and swap gates,
   the first optical circuit and the second optical circuit being configured to perform an arbitrary N-mode unitary transformation to the N input optical modes via a rectangular architecture.

2. The apparatus of claim 1, wherein N−2M+2 input optical modes in the N input optical modes are configured to transmit through about a common number of optical elements in the apparatus.

3. The apparatus of claim 1, wherein:
   each group of pulses in a first (M−2) groups of pulses from the (M−1) groups of pulses includes k pulses and a (M−1)th group includes k+1 pulses, adjacent pulses in each group of the (M−1) groups being separated by a delay $\tau$, N, M, k being positive integers, N being greater than M, and k=(N−1)/(M−1), and
   the first delay line is configured to introduce the delay $\tau$ between the Mth output port and the Mth input port.

4. The apparatus of claim 1, wherein the second optical circuit includes (M−1)(M−2)/2 beamsplitters and (M−1)(M−2) swap gates.

5. The apparatus of claim 1, wherein the first optical circuit is configured to perform the M-mode universal transformation by:
   receiving a single pulse in the (M−1)th group of pulses via one of the first (M−1) input ports;
   transmitting the single pulse to the Mth output port; and
   sending the single pulse from the Mth output port to the Mth input port in concurrence with receiving one pulse via each input port from the first (M−1) input ports.

6. The apparatus of claim 1, wherein M is about 3 to about 100.

7. The apparatus of claim 1, wherein N is about 10 to about 10000.

8. The apparatus of claim 3, wherein the first optical circuit and the second optical circuit are configured to perform an arbitrary transformation to the N input optical modes by:
   transmitting the N input optical modes through the first optical circuit for k(k+1)/2 rounds; and
   transmitting the N input optical modes through the second optical circuit for k(k−1)/2 rounds.

9. The apparatus of claim 3, wherein the second optical circuit includes:
   a second delay line configured to couple a last output port of the second optical circuit with a last input port of the second optical circuit and introduce the delay $\tau$.

10. The apparatus of claim 1, wherein the first optical circuit further includes:
    M bypass waveguides, each bypass waveguide in the M bypass waveguides configured to transmit an optical mode from an input port in the M input ports to a corresponding output port in the M output ports without transmitting the optical mode through the network of interconnected interferometers.

11. An apparatus, comprising:
a first optical circuit including a network of interconnected interferometers, the first optical circuit configured to perform an M-mode universal transformation on N input optical modes that are divided into M groups of pulses, each group of pulses in the M groups of pulses including/pulses and adjacent pulses being separated by a delay τ, N, M, and/being positive integers, N being greater than M, and l=N/M; and
a second optical circuit in optical communication with the first optical circuit and configured to perform an (2M)-mode cosine-sine transformation on the N input optical modes, the second optical circuit including:
  a first plurality of M input ports in optical communication with M output ports of the first optical circuit;
  a second plurality of M input ports in optical communication with the M output ports of the first optical circuit via M delay lines, each delay line from the M delay lines configured to couple an output port in the M output ports of the first optical circuit with a corresponding input port in the second plurality of M input ports; and
  M beamsplitters, each beamsplitter in the M beamsplitters being in optical communication with one input port in the first plurality of M input ports and one input port in the second plurality of M input ports.

12. The apparatus of claim 11, wherein the second optical circuit is configured to:
receive, via the first plurality of M input ports, a first plurality of M output optical modes from the M output ports of the first optical circuit, the first plurality of M output optical modes being generated by the first optical circuit based on a first plurality of M input optical modes in the N input optical modes, each input optical mode from the first plurality of M input optical modes being from a corresponding group in the M groups of pulses; and
receive, via the second plurality of M input ports, a second plurality of M output optical modes from the M output ports of the first optical circuit, the second plurality of M output optical modes being generated by the first optical circuit based on a second plurality of M input optical modes in the N input optical modes, each input optical mode from the second plurality of M input optical modes being from a corresponding group in the M groups of pulses.

13. The apparatus of claim 11, wherein M is about 3 to about 100.

14. The apparatus of claim 11, wherein N is about 10 to about 10000.

15. The apparatus of claim 11, wherein the first optical circuit and the second optical circuit are configured to perform an arbitrary transformation to the N input optical modes, and each optical mode in the N optical modes is configured to transmit through about a common number of optical elements in the apparatus.

16. The apparatus of claim 11, wherein the first optical circuit and the second optical circuit are configured to perform an arbitrary transformation to the N input optical modes by:
transmitting the N input optical modes through the first optical circuit for $l^2$ rounds; and
transmitting the N input optical modes through the second optical circuit for $l(l-1)/2$ rounds.

17. The apparatus of claim 11, wherein the first optical circuit further includes:
M bypass waveguides, each bypass waveguide in the M bypass waveguides configured to transmit an optical mode from an input port in the M input ports to a corresponding output port in the M output ports without transmitting the optical mode through the network of interconnected interferometers.

18. The apparatus of claim 11, further comprising:
M switchable devices in optical communication with and between the first optical circuit and the second optical circuit, each switchable device in the M switchable devices being switchable between a first state and a second state,
during the first state, the M switchable devices configured to direct M output optical modes from the first optical circuit to the first plurality of M input ports of the second optical circuit,
during the second state, the M switchable devices configured to direct M output optical modes from the first optical circuit to the second plurality of M input ports of the second optical circuit.

* * * * *